Nov. 18, 1969 L. H. FLORA 3,478,395
FASTENERS
Original Filed May 29, 1963 4 Sheets-Sheet 3
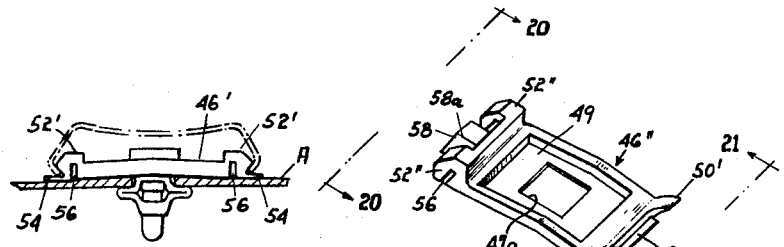
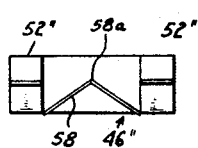
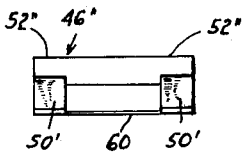
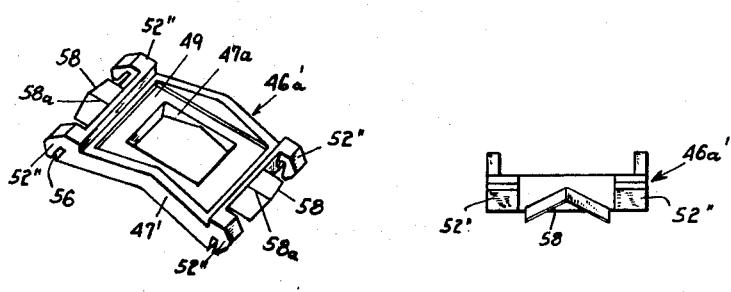
INVENTOR.
LAURENCE H. FLORA
BY *Teare, Teare & Sammon*
ATTORNEYS Nov. 18, 1969  L. H. FLORA  3,478,395
FASTENERS
Original Filed May 29, 1963  4 Sheets-Sheet 4
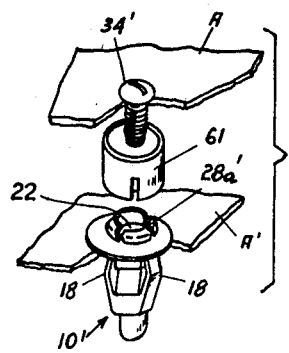
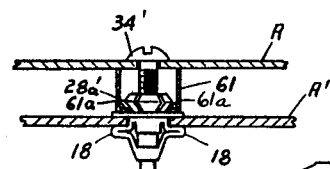
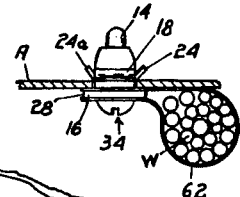
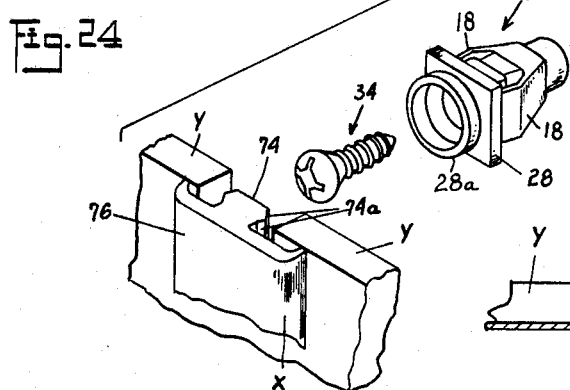
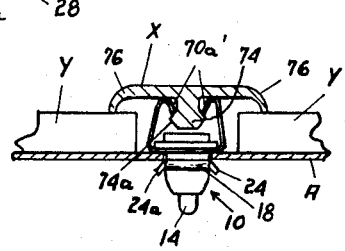
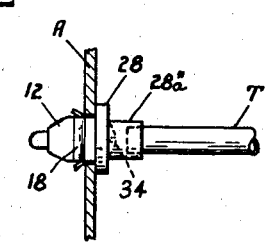
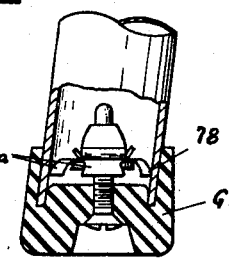
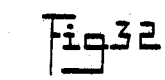
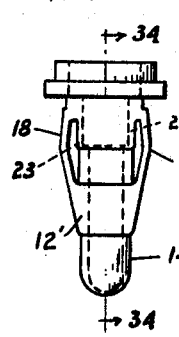
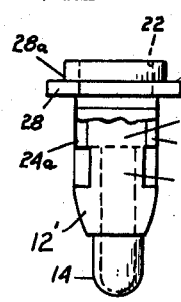
INVENTOR.
LAURENCE H. FLORA
BY *Teare, Teare & Sammon*
ATTORNEYS United States Patent Office 3,478,395
Patented Nov. 18, 1969

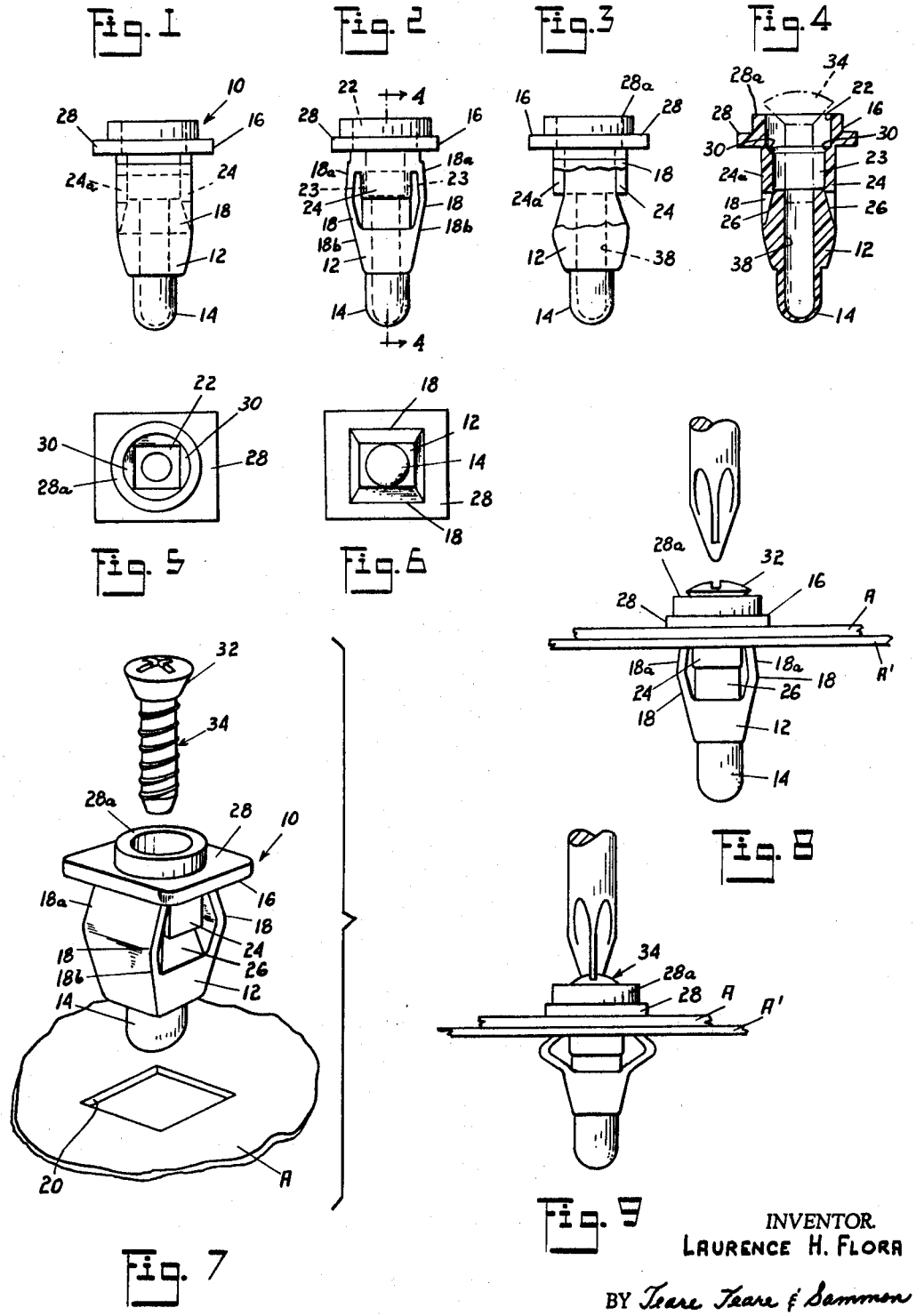

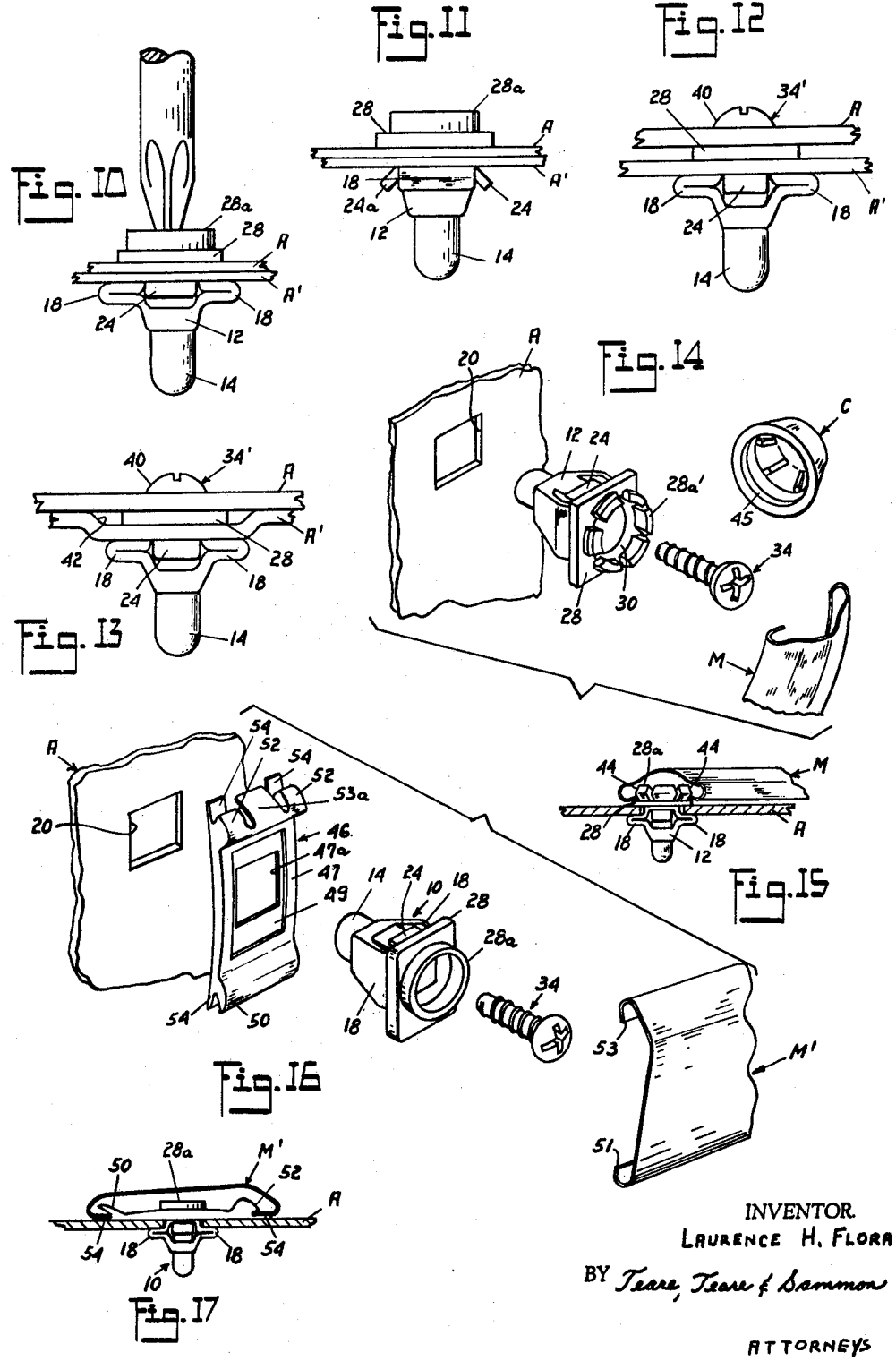

3,478,395
FASTENERS
Laurence H. Flora, North Olmsted, Ohio, assignor to Tinnerman Products, Inc., Cleveland, Ohio, a corporation of Ohio
Original application May 29, 1963, Ser. No. 284,223, now Patent No. 3,313,083, dated Apr. 11, 1967. Divided and this application Dec. 22, 1966, Ser. No. 655,248
Int. Cl. F16b 29/00
U.S. Cl. 24—73                     8 Claims

ABSTRACT OF THE DISCLOSURE

A plastic adapter to receive a plastic fastener for securement of a molding or the like to a support member including an apertured body at least one pair of spaced cam and/or anchor portions disposed adjacent opposed ends of the body for locking engagement with the molding and at least one tab portion extending outwardly between the cam and/or anchor portions for holding the molding against the cam and/or anchor portions and in spaced relation on the support member. The fastener includes a bored head portion, a pair of tab portions extending downwardly from the head portion, a bored body portion including a plunger member extending downwardly from the head portion with the upper end of the plunger member being severably connected to the tab portions, and a pair of resilient leg portions connecting the head portion to the body portion adapted to be deformed outwardly with movement of the plunger member between the tab portions upon self-threading movement of a threaded member through the lower end of the body portion, and abutments on the body portion adapted for engagement with the tab portions to limit upward movement of the body portion toward the head portion.

---

This application is a division of the application of Laurence H. Flora, Serial No. 284,223, filed May 29, 1963, now Patent No. 3,313,083.

This invention relates in general to fastening means, and more particularly to plastic fasteners for the securing of two or more members together, such as for instance a pair of metal panels, or the securing of, for instance, molding or trim strip to a panel.

The fastener means of the instant invention is adapted to be used in place of sheet metal fasteners, or sheet metal screws, or nuts and bolts, and is particularly adapted for use in blind location attachments, where only one side of an assembly is accessible to a workman. The plastic fastener arrangements of the invention provide the ultimate in molding retention, and overcome rusting problems relating to the engagement of dissimilar metals, and lessen chances of trapped moisture in the assemblies.

Accordingly, an object of the instant invention is to provide novel plastic fasteners for holding two or more members together.

Another object of the invention is to provide a deformable plastic fastener which may be readily inserted through aligned openings in two or more members, or through an opening in only one of the members, and deformed to a holding position from only one side of the supporting member, for securely attaching the members together.

Another object of the invention is to provide various forms of fasteners for tying or fastening together a pair of members, such as a pair of superimposed panels, and wherein the fastener comprises a comparatively small, inexpensive member of plastic material, which fastener is adapted to extend through apertures in the panel members, and to be deformed upon threaded driving of a screw associated therewith, for securely attaching the members together.

Another object of the invention is to provide a deformable plastic fastener adapted to secure a pair of members together, such as for instance a pair of panel members having aligned apertures therethrough, and wherein the fastener comprises a body portion, a head portion, and laterally disposed strap-like collapsible locking legs extending between the head and body portions, and wherein a threaded member is adapted to extend between the head portion and the body portion, and to draw the body portion toward the head portion when the fastener is in said apertures, thereby causing the locking legs to collapse behind the panel assembly, and secure the fastener to the supporting panel members.

A still further object of the invention is to provide a plastic fastener arrangement which is adapted for attachment to a supporting member or panel, and which eliminates the problems of rusting due to engagement between dissimilar metals, and which embodies means thereon for readily attaching a trim strip to the supporting member or panel, and in a manner to prevent the entrapment of moisture behind the trim strip.

Other objects and advantages of the invention will be apparent from the following description taken in conjunction with the accompanying drawings wherein:

FIG. 1 is an enlarged side elevational view of a plastic fastener constructed in accordance with the instant invention;

FIG. 2 is an end elevational view of the fastener of FIG. 1;

FIG. 3 is a partially broken view of the fastener of FIG. 1, to show the cam surfaces on the body portion of the fastener;

FIG. 4 is a sectional view taken generally along the plane of line 4—4 of FIG. 2, looking in the direction of the arrows;

FIG. 5 is a top plan view of the fastener illustrated in FIG. 1;

FIG. 6 is a bottom plan view of the FIG. 1 fastener;

FIG. 7 is an exploded view of the fastener of FIGS. 1 through 6 preparatory to insertion of the same in a receiving opening or aperture in a supporting panel, and illustrates the threaded screw member which is adapted for threaded coaction with the fastener to deform or collapse the same into secured relation on the panel;

FIG. 8 is a view showing the fastener assembly of FIG. 7, assembled on the panel, and ready for rotation of the threaded screw member for collapsing the fastener;

FIG. 9 is a view of the plastic fastener in partially collapsed or deformed condition, due to threading rotation of the associated screw member and resultant movement of the body portion of the fastener toward the head portion;

FIG. 10 is an elevational view illustrating the plastic fastener in fully collapsed condition;

FIG. 11 is an elevational view taken from the right side of FIG. 10, and better illustrating the auxiliary locking tabs on the fastener which aid in locking or securing the fastener to the supporting panel or panels, and which also aid in sealing the apertures in the panels;

FIG. 12 is a view similar to FIGS. 10 and 11 but showing a modified assembly of a plastic fastener;

FIG. 13 is an elevational view similar to FIG. 12, but showing a further modified assembly of the plastic fastener;

FIG. 14 is an exploded view of a modified form of the fastener illustrated in FIGS. 1 to 6, and more particularly a plastic fastener wherein the head of the fastener is adapted to secure a molding or other member to the supporting panel;

FIG. 15 is a reduced size, sectional view of the fastener assembly of FIG. 14 on the supporting panel and holding a molding on the panel;

FIG. 16 is a further exploded view of the fastener of FIG. 7, but adapted for use with a further plastic fastener or adapter, which plastic adapter is adapted to secure a resilient type molding to the supporting panel;

FIG. 17 is a reduced size sectional view of the FIG. 16 arrangement as assembled on the supporting panel, and with the molding being held in secured relation on the panel by the aforementioned plastic adapter;

FIG. 18 is a sectional view generally similar to FIG. 17, but showing a modified form of plastic adapter;

FIG. 19 is a generally enlarged, perspective view of a further modified form of plastic adapter, as compared to that of FIGS. 17 and 18;

FIG. 20 is an end view of the plastic adapter of FIG. 19, taken generally along the plane of line 20—20 of FIG. 19, looking in the direction of the arrows;

FIG. 21 is an end view of the plastic adapter of FIG. 19, taken generally along the plane of line 21—21 of FIG. 19, looking in the direction of the arrows;

FIG. 22 is a further modification of a plastic adapter for holding molding on a panel;

FIG. 23 is an end view of the plastic adapter of FIG. 22;

FIG. 24 is a partially broken exploded view of a fastener assembly utilizing a plastic fastener of the general type illustrated in FIG. 14, and adapted for use with a spacer member for spacing a pair of supporting members or panels from one another;

FIG. 25 is a sectional view of the fastener-spacer member assembly of FIG. 24;

FIG. 26 is a sectioned, elevational view showing a further assembly of the fastener of FIG. 12 as mounted on a supporting panel, and more particularly one adapted to hold a bundle of electrical wires or fluid conveying conduits on the supporting panel;

FIG. 27 is an enlarged, exploded view of a further modified form of assembly, utilizing the plastic fastener of FIGS. 1 to 6 in conjunction with a resilient clip;

FIG. 28 is a sectioned view of the assembly illustrated in FIG. 27 as mounted in secured relation on the supporting panel;

FIG. 29 is an elevational view, showing a further modified assembly of the plastic fastener illustrated for instance in FIGS. 1 to 6, and more particularly one adapted for anchoring or holding a wire or tubular shelf on a supporting panel;

FIG. 30 is a further modified, sectioned assembly of the fastener device of the invention, and showing the same as used for attacting a leg glider to a tubular leg of a table, chair or the like;

FIG. 31 is a side elevational view of another modified form of fastener of the general type illustrated in FIGS. 1 to 6;

FIG. 32 is an end elevational view of the fastener of FIG. 31;

FIG. 33 is a partially broken elevational view of the fastener of FIG. 31; and

FIG. 34 is a sectional view taken generally along the plane of line 34—34 of FIG. 32, looking in the direction of the arrows.

Referring now again to the drawings, and particularly to FIGS. 1 through 6 thereof, there is shown a plastic fastener 10 comprising a generally wedge-shaped body portion 12 having a protrusion 14 projecting downwardly therefrom. A head portion 16 is secured to the body portion 12, and by means of relatively thin collapsible or deformable strap-like legs 18 extending between the head and body portions, and merging therewith. As best seen for instance in FIG. 2, the legs 18 initially diverge or slope slightly outwardly as at 18a and then turn inwardly as at 18b to smoothly merge with the tapered or wedge-shaped body portion 12. Such a diverging arrangement is useful in insertion of the fastener into the opening or aperture 20 in a supporting member or panel A (FIG. 7) and for holding the fastener in assembled relation with the panel prior to its being deformed or collapsed to secured relation on the panel.

The fastener may be formed from a single piece of relatively high strength, deformable plastic material, such as for instance nylon. It may be die-molded lending itself to mass production procedures.

As can be best seen in FIG. 4, there is an opening 22 extending through the fastener which is open at its upper end, but preferably closed at its lower end, in the embossment portion 14. Relatively thin plastic sections 23 (FIG. 2) which sections may be of the order of two-hundredths of an inch thickness, also connect the body portion 12 to the head portion 16. These thin sections supplement the connection of the aforementioned locking legs 18.

Depending from the head portion 16 and on opposite sides of the body portion as compared to the sides of the body portion on which are disposed the strap-like legs 18, are deformable tabs 24, 24a. The lower ends of the tabs are adapted for sliding coaction with tapered cam surfaces 26 (FIG. 4) on the body portion 12, upon inward movement of the body portion toward the head portion, as will be hereinafter described, whereupon the tabs 24, 24a will be forced or deformed outwardly away from one another.

The head 16 preferably embodies a flange portion 28 which flange portion may be adapted for abutting engagement with the confronting side of the supporting panel A, and a collar portion 28a projecting upwardly from the flange. The head has abutment surfaces 30 therein, which are adapted for engagement with the head 32 of the threaded member 34 (FIG. 7) for limiting the movement of the screw into the collar. Head 32 of member 34 may also be of such diameter so as to frictionally engage the interior of head 16 of the fastener 10 during threaded rotation of screw 34. The collar portion 28a is preferably of such depth that the head 32 of the screw is received completely therein upon collapsing of the fastener into its finalized secured condition on the supporting panel or panels A, A', as shown for instance in FIGS. 10 and 11 of the drawings.

Referring now to FIGS. 7 through 11, it will be seen that the fastener may be first inserted through aligned polygonal openings in the panels A, A', and the threaded member 34 upon rotation thereof threadedly engages and cuts into the interior surface 38 of opening 22 and commences to draw the body portion 12 axially toward the flanged head portion 16 thereby causing collapsing of the strap-like leg portions 18, which as aforementioned already diverge outwardly with respect to one another at 18a. This initial collapsing may occur before head 32 of the screw engages abutments 30. Further rotation of the threaded member 34 causes further movement of the body portion 12 toward the head portion and movement of the fastener to its finalizing deformed condition as shown for instance in FIGS. 10 and 11. During the inward movement of the body portion toward the head portion due to the rotation of the threaded member 34 and its threaded coaction with surface 38 of the fastener, the aforementioned tabs 24, 24a slide on cam surfaces 26 and are cammed outwardly by such cam surfaces, thereby forcing the tabs outwardly and forming an auxiliary locking of the fastener to the supporting panels A and A' as shown for instance in FIG. 11. Also such tabs guide the axial movement of the body portion toward the head portion.

When the fastener is drawn up tight as shown in FIGS. 10 and 11, the deformed or collapsed legs 18 and the tabs 24, 24a, engage in sealing relation with the peripheries of the openings 20 in the panels and effectively seal such openings against the entry of moisture, etc. It will also be seen that due to the closed lower end of the projection 14, no moisture can enter through the passage 22 in the fastener. The screw 34 may be preassembled with the plastic fastener to the general position illustrated in FIG. 8, for facilitating the assembly of the fastener to the panels.

Referring now to FIG. 12, there is shown a modified assembly wherein the flange portion 28 of the plastic fastener is disposed intermediate supporting panels A and A' and thereby providing an insulator for insulating the panels from one another. In this embodiment, the collar portion 28a may be eliminated, and the head 40 of the screw member 34' may directly engage the confronting surface of the panel A.

Referring to FIG. 13, an assembly is illustrated wherein the panel A' is embossed as at 42 and receives therein the flange portion 28, the latter being disposed in the embossment 42, which results in contact between the panels A, A' as opposed to the spaced relationship illustrated in FIG. 12.

Referring now to FIG. 14 there is illustrated a slightly modified form of fastener, and wherein the collar portion 28a' is slotted to give it considerable resiliency, and wherein the exterior surface of the collar is provided with sloping cam surfaces 44 (FIG. 15) adapted for snap fastening coaction with a member, such as for instance the molding M, or for instance a plastic cap C, which will then be held in attached condition on the supporting panel. Cap C may have a slight circumferential indentation 45 for holding coaction with collar 28a'.

Referring now to FIG. 16, there is illustrated a plastic fastener 10 of the aforedescribed type, which is adapted to attach to the panel, another plastic fastener or plastic adapter 46 which is also preferably formed of a relatively high strength plastic material, such as for instance nylon. Adapter 46 comprises a generally flattened, polygonal shaped body 47, having an opening 47a therethrough, which is formed generally complementary to the polygonal cross sectional configuration of the fastener 10, for receiving the latter therethrough, and until the flange portion 28 of the fastener 10 engages the confronting recessed section 49 of the adapter. There is preferably provided a certain amount of clearance between the periphery of the opening 47a and the fastener 10 so that the fastener 10 more or less floats within the adapter 46 to allow for some hole misalignment. One end of the fastener or adapter 46 is provided with a slotted anchor portion 50 which is adapted to receive an edge 51 of the flange of conventional resilient trim strip M' therein, and the other end of the fastener 46 may be provided with spaced sloping cam surfaces or portions 52 for snap fastening coaction with the other edge 53 of the trim strip M', for anchoring the trim strip to the supporting panel A. There is also preferably provided a resilient tab 53a intermediate cam portions 52 which is adapted to resiliently engage the confronting edge 53 of an associated molding and tighten up on the holding coaction between the adapter and the molding. As can be seen from FIG. 16, tab 53a extends outwardly beyond the cam locking portions 52, and provides for greater molding tolerance.

The ends of the plastic adapter may be provided with laterally spaced relatively thin flanges or tabs 54 underlying portions 50 and 52 respectively, which tabs extend outwardly from the ends of the adapter a sufficient amount so as to engage the end flanges 51, 53 of the molding M' and hold it in spaced relation to the supporting panel A, thus preventing engagement between dissimilar metals and associated rusting problems, as well as slightly spacing the molding from the supporting panel to lessen the chances of trapped moisture. The body portion 47 may have a slight arcuate configuration 55 as best seen in FIG. 16 so that it engages in more or less tensioned condition with the confronting surface of the supporting panel A, upon drawing up or tightening of the fastener 10 on the panel.

Referring now to FIG. 18, there is shown a modified form of plastic adapter 46' which has locking cam portions 52' at both ends thereof, for snap fastening coaction with molding at both ends of the adapter, and in this embodiment, the adapter is preferably slotted completely transversely thereof as at 56 in such cam portions 52', for increasing the resiliency or "give" of such cam portions, thereby permitting greater molding variation tolerance, and eliminating molding distortion. In other respects, the adapter 46' may be generally similar to that of FIGS. 16 and 17, and includes the tabs 54 at its ends, for spacing the molding from engagement with the underlying panel.

Referring now to FIGS. 19, 20 and 21, there is illustrated a further modified form of plastic adapter member 46'' which is generally similar to the adapter 46 of FIGS. 16 and 17, and includes the tabs 54 at its ends, for of the FIGS. 16 and 17 arrangement, and which also includes in the cam sections 52'' thereof, slots 56 for increasing the resiliency or "give" of such cam sections. Also in this arrangement, there is provided a more or less resilient, inverted V-shaped flange or tab 58 which is adapted to engage the confronting surface of a panel and also at its peak 58a, engage the overlying flange (e.g. 53) of an associated molding, and not only space the molding from engagement with the support panel, but also to urge the molding flange into a tight engagement with the cam portion 52'' of the adapter. As can be seen in FIG. 19, such flange or web 58 extends outwardly beyond the outer extremities of the associated cam sections 52''. Also, intermediate the laterally spaced anchor portions 50' of such adapter, there is provided a more or less linear web or flange 60, which is adapted to space the corresponding flange of the molding from engagement with the supporting panel.

FIGS. 22 and 23 illustrate a further modified form of an adapter 46a' wherein the body 47' of the adapter is more or less curved into a generally inverted V-shaped configuration for increased resiliency and tensioned relationship of the adapter with the confronting surface of a supporting panel, and wherein such adapter is provided with inverted V-shaped end webs 58 generally similar to that utilized on the adapter of FIG. 19 and 20. In this form of adapter, slotted cam portions 52'' are provided on both ends of the adapter.

Referring now to FIGS. 24 and 25, there is shown a fastener assembly wherein a fastener 10' of the general type of FIGS. 1 to 6 is utilized in conjunction with a spacer member 61 for spacing a pair of panels A, A' with respect to one another. Such spacer member may have inturned flanges 61a (FIG. 25) which coact in snap fastening coaction with the slotted collar 28a' of the fastener 10', for holding the spacer in assembled relation with the fastener. The threaded fastener member 34' which upon rotation collapses the legs 18 of the fastener 10', is preferably of a longer dimension than that of, for instance, fastener 34, so that the threaded fastener 34' can readily engage the interior surface of passageway 22 through the fastener 10'. It will be seen that if the spacer member 58 is of insulating material, such as for instance plastic, it effectively insulates panel or member A from panel or member A'.

Referring now to FIG. 26, there is shown another modified assembly utilizing a fastener of the general type illustrated for instance in FIGS. 1 to 6, and wherein there is associated therewith a loop-like band or strap 62 which is adapted to secure a bundle of conduit or wires W to the supporting panel A. It will be noted that in this form of fastener, the collar has been eliminated on the head portion 16 thereof, and that such head portion holds the band 60 between the flange 28 of the head portion and the confronting panel.

Referring now to FIGS. 27 and 28, there is shown a further fastener assembly utilizing a plastic fastener 10 of the general type aforedescribed in connection with FIGS. 1 to 6, and wherein there may be provided a U-shaped resilient member 70, which has a polygonal shaped opening 70a through the base thereof, for receiving therethrough the fastener 10, and wherein the head flange 28 on such fastener 10 will engage such base portion of the U-shaped member 70, and hold and orient such member against the supporting panel A. After the fastener is applied to the supporting panel A thereby securing the U-shaped member 70 thereto, a strip or molding member X having a locking projecting portion 74 with cam surfaces 74a thereon, may be moved into snap fastening coating relation with the flanges 70a' of U-shaped member 70, as best shown for instance in FIG. 28. The wings 76 of the member X may be utilized to hold adjacent panels or members Y against the supporting panel A and as shown at FIG. 28. Member X may be conveniently extruded from plastic or aluminum or any other suitable material to give its particular configuration.

FIG. 29 illustrates a further use or assembly of the plastic fastener of the invention wherein the collar portion 28a" which surrounds the associated threaded screw member 34, is preferably of a slightly longer length than that shown for instance in FIGS. 1 to 6, and which may be adapted to receive an end of a wire or tube member T therein, in generally supporting or anchored relation for, for instance, supporting the tube member T on a supporting panel A. Tube member T may represent a part of, for instance, a wire shelf or the like, which as will be seen can be conveniently anchored to the supporting panel A by utilizing the collar 28a' as a support for the member T.

Referring to FIG. 30, there is illustrated an assembly which can be utilized for attaching a leg glider C to a tubular leg of a chair or table or the like. In this arrangement, a pronged, washer-like resilient clip 78 preferably of metal, having a polygonal shaped opening therethrough for receiving therethrough a plastic fastener member, can be assembled with a fastener 10 of the general type illustrated for instance in FIGS. 1 to 6, and upon assembly of the unit into the leg, the resilient prongs 78a on the clip dig into the confronting surfaces of the tubular leg and anchor the fastener and clip assembly in the leg. Upon collapsing of the fastener by the screw 34', to the position illustrated, the glider is moved into snug relationship with the end of the tubular leg.

Referring now to FIGS. 31 to 34, there is shown a furthere modified form of the plastic fastener and of the general type illustrtaed for instance in FIGS. 1 to 6. In this arrangement, the plastic fastener does not embody any cam surfaces on the body 12' thereof, which will urge the tab portions 24, 24a outwardly, and thus such fastener does not possess the tab locking feature aforedescribed in connection with FIGS. 1 to 6. However, such fastener does possess the collapsible strap-like legs 18 which are adapted to collapse and to secure the fastener to a support panel. In addition, during threaded insertion of a rotatable screw member into such fastener, the outward deformation of the body 12' of the fastener will cause some outward movement of the tab portions 24, 24a away from one another, but not to the extent aforedescribed in connection with the FIGS. 1 to 6 embodiment. However, the tabs 24, 24a will aid in guiding the plunger portion 80 of the fastener body 12' during the latter's inward axial movement toward the head portion 16, and engagement between the ends of the tabs and confronting abutment surfaces 82 on the body 12' serve to limit such axially inward movement of the body portion toward the head portion, upon collapsing or folding of the legs 18.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

I claim:

1. A plastic adapter adapted for attachment to an apertured panel for holding resilient type molding on the panel, said adapter comprising,
   (a) a body portion,
   (b) means on said body portion for attaching the adapter to the panel,
   (c) means on said body portion for coacting in snap-fastening relation with a molding for holding the molding in attached relation to the panel,
   (d) means for maintaining the molding in spaced relation to the panel,
   (e) the third mentioned means comprising a resilient inverted V-shaped tab projecting outwardly from said body portion, said tab being adapted to not only space the molding from the panel but also to resiliently urge the molding against the second mentioned means.

2. A plastic adapter in accordance with claim 1, wherein said first mentioned means includes
   (a) a polygonal opening in said body portion adapted to receive a fastener for securement of said adapter to said panel.

3. A plastic adapter in accordance with claim 1, wherein said body portion is of
   (a) an inverted generally V-shaped configuration, in side elevation, adapted for resilient coacting engagement with said panel.

4. A plastic adapter in accordance with claim 1 including,
   (a) a pair of laterally spaced cam portions made integral at one end of said body portion on opposite sides of said tab adapted for snap-fastening coaction with said molding.

5. A plastic adapter in accordance with claim 2, wherein said cam portions each include,
   (a) slots extending transversely therethrough for increasing the resilient characteristics thereof.

6. A plastic adapter in accordance with claim 4, including,
   (a) a pair of laterally spaced anchor portions made integral at the opposite end of said body portion adapted for snap-fastening coacting engagement with said molding, and
   (b) a relatively thin resilient web portion extending outwardly from said body portion in underlying relation between said anchor portions adapted for holding said molding in spaced relation on said panel.

7. A plastic adapter in accordance with claim 1, including,
   (a) a pair of laterally spaced cam portions disposed at each of the opposed ends of said body portion, and
   (b) one of said tabs extending outwardly between each pair of said cam portions.

8. A plastic adapter in accordance with claim 1, wherein said body portion includes,
   (a) a polygonal recessed portion on one side thereof, and (b) a polygonal opening extending through said recessed portion adapted to receive a fastener therethrough and inseated relation in said recess portion for securement of said fastener to said panel.

References Cited

UNITED STATES PATENTS

| | | | |
|---|---|---|---|
| 3,122,804 | 3/1964 | Stawinski | 52—718 X |
| 3,127,965 | 4/1964 | Weisenberger. | |
| 3,143,916 | 8/1964 | Rice | 85—71 |
| 3,313,083 | 5/1967 | Flora | 52—718 |

FOREIGN PATENTS 539,191　　1955　Belgium.

JOHN E. MURTAGH, Primary Examiner

U.S. Cl. X.R.

52—718